Patented June 15, 1937

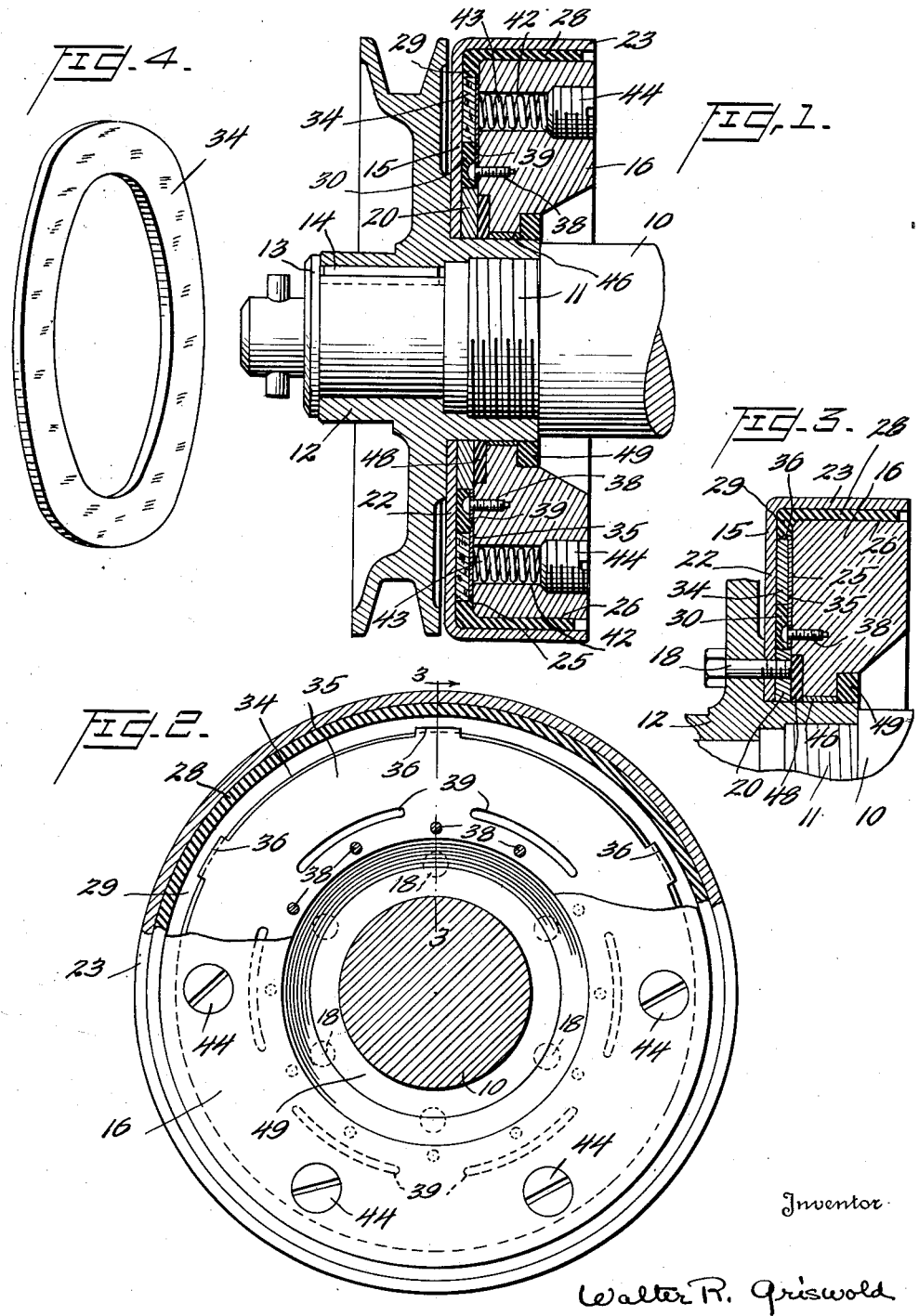

2,083,561

UNITED STATES PATENT OFFICE

2,083,561

INTERNAL COMBUSTION ENGINE

Walter R. Griswold, Detroit, Mich., assignor to Packard Motor Car Company, Detroit, Mich., a corporation of Michigan Application January 15, 1935, Serial No. 1,957

12 Claims. (Cl. 74—574)

This invention relates to internal combustion engines and has for its object the provision of means for damping torsional vibrations induced in the engine crankshaft as the result of the periodic torque impulses applied thereto. It is a feature of the invention that the various component parts of the vibration damper may be separately and cheaply constructed and readily assembled.

The damper which forms the basis of the present invention is of the type employing an inertia member supported for slight displacement relative to the crankshaft in response to torsional vibrations induced in the shaft, and a coupling between the inertia member and the shaft, this coupling serving to yieldingly connect the inertia member to the shaft in such manner as to permit the required relative displacement of the inertia member and shaft, and also serving as an energy absorbing device, the energy of vibration being dissipated in the form of heat as the result of friction developed in the coupling on occurrence of such relative displacement.

More specifically, the present damper is of the type in which the inertia member is coupled to the shaft by means composed, at least in part, of rubber or similar material adapted to develop a considerable amount of internal friction when subjected to stress. The dissipation of energy by reason of such internal friction in a coupling member is frequently not sufficient to effectively damp the vibrations, and the action of the coupling member is preferably augmented by the provision of a friction connection between the inertia member and the shaft, the combined action of the yielding and friction connections serving to prevent dangerous increase in amplitude of the vibrations. It is a feature of the invention that the friction connection may be readily adjusted to alter the degree of friction after the damper has been installed, this being important in view of the difficulty of predetermining the amount of friction required in any given damper.

While rubber has heretofore been employed for the general purpose hereinbefore mentioned, it is sometimes difficult to apply a yielding coupling of this character to a damper in such a manner that the rubber will respond to vibrations of the extremely high frequency induced in crankshafts of modern internal combustion engines. While the amplitude of these vibrations is not large, they are capable of building up to dangerous proportions if not effectively damped, and it is important that the coupling should be so constructed that the rubber will be deformed to a considerable extent even though the amplitude of the induced vibrations and the resulting relative angular displacement of the crankshaft and inertia member are comparatively small.

In the present construction, at least a part of the resilient coupling between the inertia member and the member carried by the crankshaft is disposed at a considerable radial distance from the shaft axis, at which point the relative linear movement of the inertia member and the member carried by the crankshaft is considerable, even for small relative angular displacement of the members. It has been found that with such disposition of the resilient coupling, the tendency of the inertia member to wobble during operation is much more effectively resisted by the rubber than when the latter is located at a point closer to the crankshaft axis, the leverage exerted on the rubber by the inertia member when displaced laterally of its normal plane of rotation being decreased as the radial distance between the shaft axis and the inertia member is increased.

It is a further object of the invention to provide, in a vibration damper of the type employing a shaft carried member adapted to be secured to a shaft, an inertia member journalled by means of a bearing on the shaft carried member, and a friction coupling between the inertia member and the shaft carried member, means coacting with the members to house and completely isolate both the bearing for the inertia member and the friction coupling between the members, to prevent the entry of dirt and grease and the resulting impairment of efficiency of these parts. In accordance with the present invention, this isolation of the friction coupling and the bearing for the inertia member is effected by the provision of resilient elements surface bonded to both members and located on each side of the friction coupling and of the bearing, these resilient elements serving at the same time to connect the inertia member and the shaft carried member for substantially synchronous rotation, the elements being of such nature as to develop internal friction to augment the effect of the frictional connection in dissipating the energy of vibration.

The present invention is an improvement of the construction disclosed in my prior Patent No. 1,984,579, granted December 18, 1934, the effectiveness of the resilient connection being increased by the surface bonding of the resilient elements to the inertia member and the hub member at additional points and over a larger area, the resilient elements being further so disposed as to isolate from each other the friction coupling and the bearing for the inertia member, thereby preventing dust or small particles from the friction coupling from contacting with the bearing.

Further objects and features of the invention will be apparent from the following description taken in connection with the accompanying drawing, in which Figure 1 is a sectional view taken substantially on the diameter of a damper constructed in accordance with the invention;

Figure 2 is an end elevation with portions of the damper removed to more clearly illustrate the arrangement of the elements thereof;

Figure 3 is a fragmentary sectional view taken substantially on the line 3—3 of Figure 2; and Figure 4 is a perspective view on a reduced scale of an element of the friction coupling.

In describing the embodiment of the invention disclosed herein, specific language will be used in order to facilitate an understanding of the principles of the invention, but it will be understood that no limitation of the scope of the invention is thereby intended and that various changes and alterations may be made without departing from the spirit of the invention as claimed herein.

Referring specifically to the drawing, it will be observed that the damper is shown as supported on the forward end of a crankshaft 10, the end of the crankshaft being reduced in size and being provided with a threaded portion as indicated at 11 on which the hub of the usual fan pulley 12 may be screwed, the pulley being keyed to the crankshaft as indicated at 14 and being retained in position thereon by the nut 13 which is threaded into the end of the crankshaft in the customary manner. It will be appreciated that the damper which forms the subject of the present invention may be mounted directly on the shaft if desired; it is ordinarily found convenient, however, to mount the damper on the fan pulley and the preferred embodiment of the invention is of such a nature as to lend itself readily to this particular form of mounting.

The damper consists primarily of a shaft carried member 15 and an inertia member 16, the shaft carried member being secured rigidly to the pulley 12 by means of bolts 18, these bolts extending through aligned apertures in the pulley and shaft carried member and having threaded engagement with the latter and with an annular element 20, the shaft carried member 15 and the annular element 20 having central openings therein of such diameter that they may be fitted snugly on the hub of the pulley 12 as shown more particularly in Figures 1 and 3.

The shaft carried member 15 comprises a disk-like radially extending portion 22 and a peripheral annular axially directed portion 23, it being observed that the member 15 is thereby formed to provide a generally cup-shaped structure disposed coaxially with the crankshaft and open toward the rear of the latter. The inertia member 16 is received within this cup-shaped portion and is of generally annular shape, being provided with a radial face 25 and a circumferential face 26, these faces being respectively arranged in opposed spaced relation with the corresponding faces of the radial portion 22 and the axially directed portion 23 of the shaft carried member 15. Resilient means of deformable, imperfectly elastic material such as rubber is interposed between the opposed spaced faces of these members, preferably in the form of a thin sheet or sheets, vulcanized or otherwise surface bonded to both members. For instance, a rubber sheet 28 may be interposed between and vulcanized to the inner face of the axially directed portion 23 of the shaft carried member 15 and the circumferential face 26 of the inertia member 16 over substantially the entire area of these faces, the rubber sheet further extending inwardly as at 29 and being surface bonded to the radial face 25 of the inertia member 16 and the opposed rearwardly directed face of the radially directed portion 22 of the shaft carried member 15. A second sheet of rubber or similar material 30, spaced inwardly of the sheet 28, is also connected between these opposed radial faces as hereinafter more fully described. Intermediate the sheets 28 and 30 is positioned a friction developing device acting between the inertia member and the shaft carried member to resist relative oscillatory movement thereof, it being observed that this friction developing device is completely isolated by the resilient elements 28 and 30 in the manner described.

In the preferred embodiment of the invention the friction developing device comprises an annulus 34 of any well-known friction developing material such as cork, asbestos, or the like. Ground cork impregnated with a binder has been found particularly suitable. The annulus 34 may be carried by a flat plate or disk 35 of relatively thin sheet metal or the like, plate 35 being provided with a peripheral flanged portion, preferably in the form of a plurality of axially directed lugs 36, which engage the periphery of the annulus 34 as shown more particularly in Figures 2 and 3 to retain and center the latter in position. If desired the annulus may be cemented or otherwise secured to the plate 35 so that these elements may be readily assembled in the damper as a unit.

The plate 35 may be provided with a centrally disposed opening of sufficient diameter to enable the same to be received on the periphery of the annular element 20 and is apertured to receive a plurality of elements 38 which may be threaded in the inertia member 16 to secure the plate rigidly thereto. The plate 35 may also be slotted at a plurality of points to increase the flexibility thereof, as indicated at 39.

In order to increase the amount of friction developed by the annulus 34, coil springs or other resilient means are preferably disposed in a plurality of circumferentially spaced apertures 42 extending through the inertia member from the rear to the forward side thereof. These coil springs engage the plate 35, each spring reacting against a screw 44 which is threaded in the outer end of the associated aperture 42, so that by manipulation of the screw the degree of compression of the spring 43 and thereby the amount of friction developed in the face of the annulus 34 may be readily adjusted from outside the damper and without interference with the working parts thereof. Preferably the plate 35 is so assembled with respect to the inertia member 16 that each of the slots 39 in the plate lies adjacent the point of contact of each of the coil springs 43 with the plate to provide the maximum resilience at these points. It will be observed that when the sheet 30 of resilient material is positioned between the inertia member 16 and the shaft carried member 15, it will engage the plate 35 secured to the inertia member and will be surface bonded thereto. In the event rubber is employed and is vulcanized in position, the rubber will of course flow through the slots 39 in the plate 35 and adhere directly to the inertia member 16.

The damper is preferably, although not necessarily, constructed so as to afford a journal bearing for the inertia member 16 in the crankshaft. For instance, a bushing 46 may be interposed between the inertia member and the hub of the fan pulley 12 as shown in Figure 1, this bushing being preferably of the self-lubricating type. Annular recesses are formed in the inertia member on either side of this bushing, annuli 48 and 49 of resilient material being seated in these recesses and surface bonded both to the inertia member and to the hub of the pulley 12. As in the case of the resilient elements heretofore described, imperfectly elastic material such as rubber or rubberized fabric is preferably used and vulcanization may be resorted to for the purpose of effecting the necessary bonding. The resilient elements 48 and 49 contribute only in small part to the establishment of a resilient connection between the shaft carried member 15 and the inertia member 16 and to the resultant damping of relative movement between these members by reason of the disposition of the elements 48 and 49 near the axis of the crankshaft at which point distortion of the elements is fairly small. The resilient elements 30 and 28, and particularly the latter, are on the contrary distorted to a very considerable extent on the occurrence of relative movement between the inertia and shaft carried members and the extent of deformation of these elements on the occurrence of such relative movement is increased by the use of the elements in the form of relatively thin sheets. Thus when torsional vibrations are induced in the crankshaft and transmitted to the shaft carried member 15, the mass of the inertia member 16 is sufficient to maintain the latter in a state of relatively uninterrupted rotation, and the resulting relative angular displacement of the inertia member and shaft carried member distorts the thin sheets of imperfectly elastic material, the internal hysteresis of these sheets dissipating the vibrational energy in the form of heat in the manner well understood in the art to which this invention relates.

It may be further pointed out that all of the elastic elements employed serve to resist relative axial displacement of the shaft carried member 15 and the inertia member 16. In this way the necessary resistance to reaction of the springs 43 is established.

It will be observed that the preferred embodiment of the invention shown herein may be inexpensively constructed and readily assembled. Thus the plate 35 and the annulus 34 carried thereby may be secured to the inertia member by the threaded elements 38, the annular element 20 may be spot welded in position in the shaft carried member 15, and the inertia member 16 introduced in the shaft carried member together with the rubber elements 28 and 30, the latter being then vulcanized in position. If the journal bearing 46 and the rubber elements 48 and 49 are also employed, the assembled inertia member and shaft carried member may be secured in position on the pulley 12 by means of the bolts 18 and the vulcanization of the elements 48 and 49 then effected. Alternatively, the entire vulcanizing process may be carried out at one and the same time with the damper completely assembled on the pulley 12. Introduction of the coil springs 43 in the apertures 42 and adjustment of the degree of compression thereof complete the assembling operation.

It will be seen that as the result of this construction the friction annulus 34 is completely isolated from other elements of the damper and entry of dust and dirt from the exterior of the damper is prevented. In the event the inertia member is supplied with a journal bearing on the shaft, the latter is also effectively screened, and the dissipation or breaking off of fragments of the friction developing means and the contact of such fragments with the journal bearing is avoided.

In effect the hub of the pulley 12 is a part of the assembled damper, and the shaft carried member of the damper may be considered to comprise a hub member, constituted by the hub of the pulley 12, a web member constituted by the radially directed portion 22, and a rim member constituted by the axially directed portion 23, the inertia member being received in the annular generally cup-shaped enclosure comprised by these three members. It will of course be appreciated that the crankshaft itself may be employed as the hub member, although it is preferable for convenience in construction and assembly to provide a unit which is complete in itself and which can be secured to any crankshaft by conventional means.

It will be observed that the element 20 forms in effect an enlargement or thickened portion of the shaft carried member 15 facilitating attachment of the latter to the shaft. Thus the shaft carried member 15 may be made of relatively thin sheet metal with consequent reduction in weight and expense, the element 20 affording the necessary purchase for the shaft attaching bolts without any increase in the axial dimension of the damper.

Having thus described the invention, what is claimed as new and desired to be secured by Letters Patent is:

1. In a vibration damper for crankshafts, the combination with a shaft carried member having a radially directed portion and a peripheral annular axially directed portion, said portions forming a generally cup-shaped structure, an inertia member received within said shaft carried member and having circumferential and radial faces disposed respectively in opposed spaced relation to said axially and radially directed portions of said shaft carried member, friction developing means acting between the radially directed portion of said shaft carried member and said inertia member, and means of deformable, imperfectly elastic material interposed between and surface bonded to said radially directed portion of said shaft carried member and said radial face of said inertia member both radially outwardly and inwardly of said friction developing means.

2. In a vibration damper for crankshafts, the combination with a shaft carried member having a radially directed portion and a peripheral annular axially directed portion, said portions forming a generally cup-shaped structure, an inertia member received within said shaft carried member and having circumferential and radial faces disposed respectively in opposed spaced relation to said axially and radially directed portions of said shaft carried member, friction developing means acting between the radially directed portion of said shaft carried member and said inertia member, said friction developing means comprising an annular friction element yieldingly urged against one of said members, and means of deformable imperfectly elastic material interposed between and surface bonded to said radially directed portion of said shaft carried member and said radial face of said inertia member both radially outwardly and inwardly of said friction developing means.

3. In a vibration damper for crankshafts, the combination with a shaft carried member having a radially directed portion and a peripheral annular axially directed portion, said portions forming a generally cup-shaped structure, an inertia member received within said shaft carried member and having circumferential and radial faces disposed respectively in opposed spaced relation to said axially and radially directed portions of said shaft carried member, friction developing means acting between the radially directed portion of said shaft carried member and said inertia member, said friction developing means comprising an annular friction element yieldingly urged against one of said members, and rubber annuli interposed between and vulcanized to said radially directed portion of said shaft carried member and said radial face of said inertia member both radially outwardly and inwardly of said friction developing means.

4. In a vibration damper for crankshafts, the combination with a hub member adapted for mounting on a shaft, of an inertia member having a bearing portion rotatable on said hub member, a friction connection between said members, and means cooperating with said members to completely house said friction connection and bearing portion, said means comprising deformable material positioned between said members intermediate said friction connection and bearing portion and surface bonded to both members, said last named means serving to resist the reaction of said friction connection and to isolate said friction connection and bearing portion.

5. In a vibration damper for crankshafts, the combination with a member adapted to be secured to a shaft and having a cylindrical hub portion, an axially extending cylindrical outer rim portion overlying said hub portion, and a web connecting said portions, of an inertia member of annular shape positioned intermediate said rim and hub portions and journalled on the latter, means of deformable, energy absorbing material interposed between and surface bonded to said rim portion and said inertia member over substantially the entire peripheral surface of the latter to resist relative rotation of said members, a friction connection between said inertia member and said web, whereby vibrations of relatively low amplitude and high frequency may be effectively dampened, and means of deformable material interposed between and surface bonded to said inertia member and said web on both sides of said friction connection to completely isolate the latter.

6. In a vibration damper for shafts, the combination with a hub member having an external bearing and adapted to be secured on a shaft, said hub member having a hub portion, an outwardly extending web portion, and an axially extending rim portion overlying said hub portion, said web portion, hub portion, and rim portion forming a substantially cup-shaped housing, of an annular inertia member journalled on said bearing and lying within said housing, a friction connection between said members acting against said web portion, and annular deformable elements interposed between said inertia member and said hub portion on that side of the said bearing remote from the web, and between said rim portion and said inertia member, and between said web portion and said inertia member on each side of said friction connection, said elements being surface bonded to both members and serving to resist the reaction of said friction connection.

7. In a vibration damper for shafts, the combination of a shaft carried member having a disk-like portion formed to provide a radial surface, an inertia member arranged adjacent said shaft carried member and having a radial surface disposed in opposed spaced relation to said radial surface of said disk-like portion of said shaft carried member, friction developing means acting between said opposed surfaces of the shaft carried and inertia members, resilient means associated with said friction developing means to increase the friction developed therein, and means of deformable imperfectly elastic material interposed between and bonded to said opposed surfaces, some of said material being radially inward and some radially outward of said friction developing means.

8. In a vibration damper for shafts, the combination of a shaft carried member having a disk-like portion formed to provide a radial surface, an inertia member arranged adjacent said shaft carried member and having a radial surface disposed in opposed spaced relation to said radial surface of said disk-like portion of said shaft carried member, friction developing means acting between said opposed surfaces of the shaft carried and inertia members, resilient means associated with said friction developing means to increase the friction developed therein, and yieldable means comprising rubber arranged between and bonded to said opposed surfaces, some of said rubber forming a complete protecting ring radially inward, and some forming a complete ring radially outward, of said friction developing means.

9. In a vibration damper for crankshafts, the combination with a shaft carried member having a radially directed portion and a peripheral annular axially directed portion, said portions forming a generally cup-shaped structure, an inertia member received within said shaft carried member and having circumferential and radial faces disposed respectively in opposed spaced relation to said axially and radially directed portions of said shaft carried member, friction developing means acting between the radially directed portion of said shaft carried member and said inertia member, and an annular element interposed between said inertia member and said shaft carried member and welded to the latter, said annular element being provided with threaded openings for the reception of shaft attaching bolts.

10. In a vibration damper for shafts, the combination of a shaft carried member having a disk-like portion formed to provide a radial surface, an inertia member arranged adjacent said shaft carried member and having a radial surface disposed in opposed spaced relation to said radial surface of said disk-like portion of said shaft carried member, friction developing means acting between said opposed surfaces of the shaft carried and inertia members, means of deformable imperfectly elastic material interposed between and bonded to said opposed surfaces, and an annular element interposed between said inertia member and said shaft carried member and welded to the latter, said annular element being provided with threaded openings for the reception of shaft attaching bolts.

11. In a vibration damper for shafts, the combination of a shaft carried member having a disk-like portion formed to provide a radial surface, an inertia member arranged adjacent said shaft carried member and having a radial surface disposed in opposed spaced relation to said radial surface of said disk-like portion of said shaft carried member, friction developing means acting between said opposed surfaces of the shaft carried and inertia members, and means of deformable imperfectly elastic material interposed between and bonded to said opposed surfaces both radially outwardly and inwardly of said friction developing means, said shaft carried member being enlarged to provide an annular projection extending toward said inertia member and affording a thickened portion for attachment of said shaft carried member to said shaft.

12. A friction developing device for use in a crankshaft vibration damper, comprising a flexible metal annulus having a peripheral axially directed flanged portion and provided with elongated generally circumferential slots, and an annulus of friction developing material engaging said metal annulus, disposed outwardly of said slots, and engaged and centered by said peripheral flanged portion.

WALTER R. GRISWOLD.